US005758246A

United States Patent [19]

Miyake

[11] Patent Number: 5,758,246

[45] Date of Patent: May 26, 1998

[54] COPYING APPARATUS FOR COPYING AN IMAGE FROM A CONTINUOUS ORIGINAL TO A CUT SHEET

[75] Inventor: Norifumi Miyake, Kawasaki, Japan

[73] Assignee: Canon Kabushiki Kaisha, Japan

[21] Appl. No.: 434,720

[22] Filed: May 4, 1995

Related U.S. Application Data

[63] Continuation of Ser. No. 37,099, Mar. 25, 1993, abandoned.

[30] Foreign Application Priority Data

Apr. 2, 1992 [JP] Japan .................................... 4-108464

[51] Int. Cl.$^{6}$ .......................... G03G 15/00; G03B 27/48; G03B 27/52

[52] U.S. Cl. ................................ 399/375; 355/50; 355/55

[58] Field of Search .............................. 355/75, 243, 308, 355/309, 50, 55; 399/375

[56] References Cited

U.S. PATENT DOCUMENTS

| | | | |
|---|---|---|---|
| 4,087,172 | 5/1978 | Van Dongen | 355/308 |
| 4,227,803 | 10/1980 | Massengeil et al. | 355/50 |
| 4,264,200 | 4/1981 | Tickner et al. | 355/75 |
| 4,299,477 | 11/1981 | Ward et al. | 355/309 |
| 4,485,949 | 12/1984 | Gebhart et al. | 355/308 X |
| 5,012,284 | 4/1991 | Daughton et al. | 355/243 |
| 5,448,345 | 9/1995 | Uto et al. | 355/308 |

*Primary Examiner*—Fred L. Braun

*Attorney, Agent, or Firm*—Fitzpatrick, Cella, Harper & Scinto

[57] ABSTRACT

A copying apparatus to copy a computer form paper has a conveying unit to convey a continuous original having a belt-like shape which is formed by a plurality of continuous pages such as computer form paper, an exposing unit to expose the image of the continuous original that is conveyed by the conveying unit at a fixed position, a copying unit to copy the image exposed by the exposing unit onto one cut sheet, a range setting unit to set an arbitrary desired range of the continuous original to be copied onto one cut sheet, and a magnification setting unit for setting a copy magnification. The conveying unit conveys the continuous original by a distance according to the copy range set by the range setting unit and at a speed according to the copy magnification set by the magnification setting unit.

7 Claims, 20 Drawing Sheets

COPYING APPARATUS FOR COPYING AN IMAGE FROM A CONTINUOUS ORIGINAL TO A CUT SHEET

This application is a continuation of application Ser. No. 08/037,099 filed Mar. 25, 1993, now abandoned.

BACKGROUND OF THE INVENTION

1. Field of the Invention

The present invention relates to a copying apparatus for copying an image of a long original.

2. Related Background Art

In recent years, in a copying apparatus in which a long computer form paper on which an output of a computer has been recorded is copied as an original, the computer form paper is partitioned by perforation every page, and each page is exposed while conveying the computer form paper, thereby copying the image of one page onto a cut sheet.

In such a copying apparatus, however, in the case where the output of the computer is larger than the computer form paper, the image is cut when the output is copied on the cut sheet.

Therefore, it is hard to read the copied cut sheet, it is difficult to understand such a cut image, and such a copied cut sheet is not presentable.

SUMMARY OF THE INVENTION

It is an object of the present invention to provide a copying apparatus which can solve the above problem.

Another object of the invention is to provide a copying apparatus which can arbitrarily set a copying range of a long original.

Still another object of the invention is to provide a copying apparatus in which one image of a long original is not divided.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will now be described hereinbelow with reference to the drawings.

[First embodiment]

Figure 1:
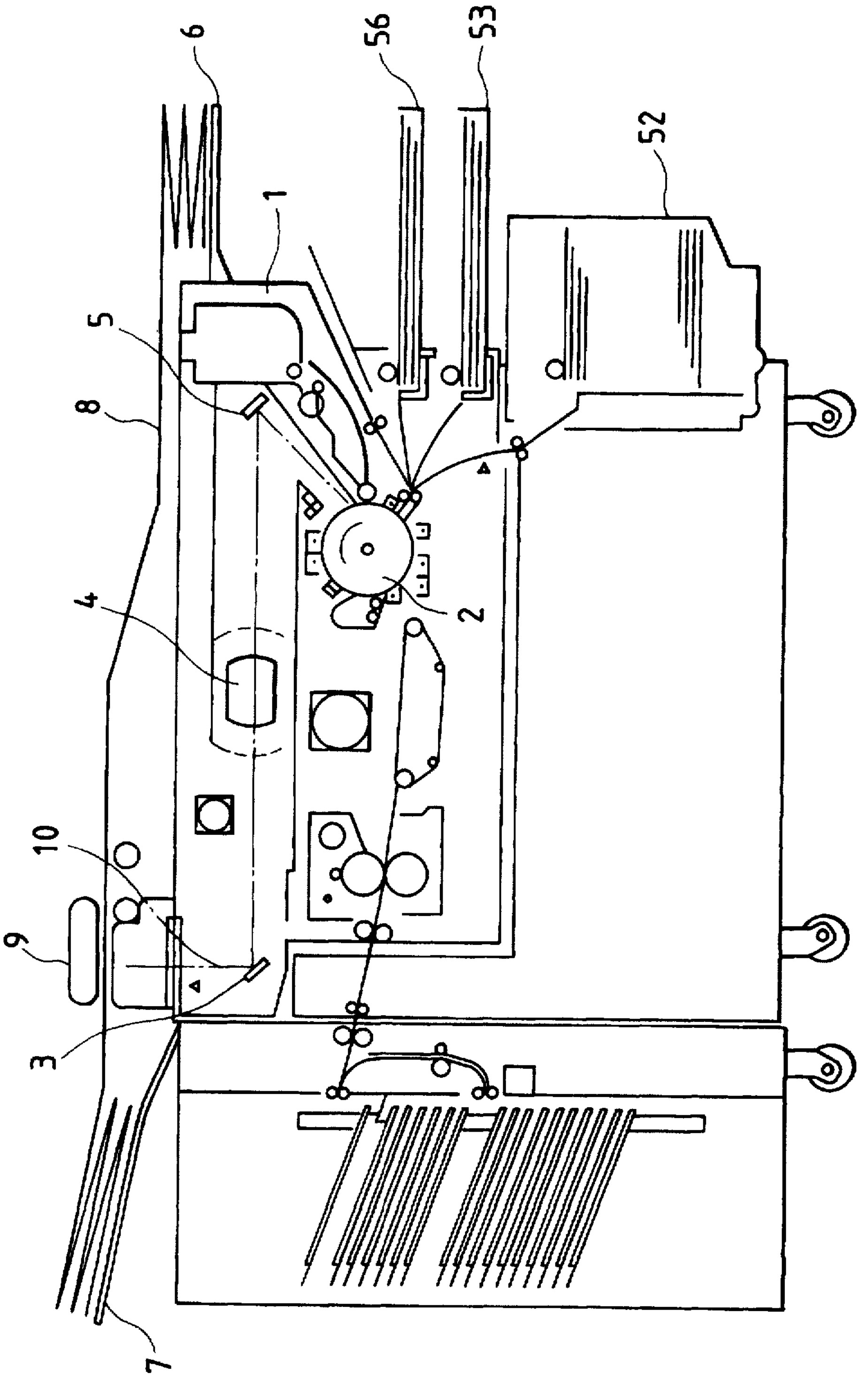
FIG. 1 is a cross sectional view for explaining a construction of an image forming apparatus showing the first embodiment of the present invention.

FIG. 1 is a cross sectional view for explaining a construction of an image forming apparatus according to the first embodiment of the present invention.

Reference numeral 1 denotes an image forming apparatus main body (main body) to execute an electrophotographic process and 2 indicates a photosensitive drum. A reflected light from an original which is scanned through a first scanning mirror 3, a zoom image forming lens (lens) 4, and a second scanning mirror 5 is formed as an image onto the photosensitive drum 2. A charging unit, a developing unit, a copy transfer charging unit, a cleaner, and the like which are necessary to execute the electrophotographic process are arranged around the photosensitive drum 2. Reference numeral 6 denotes an original tray to set a computer form paper as an original; 7 a delivery tray to deliver the computer form paper after it was scanned; 8 a computer form paper which is being conveyed; and 9 a computer form feeder (hereinafter, referred to as a CFF) to convey the computer form paper 8. A communication is executed between a CFF controller and a main body controller, which will be explained hereinafter, thereby controlling the conveyance of the computer form paper 8. In the CFF 9, the computer form paper is exposed and scanned. Reference numeral 10 denotes a light path of the reflected image from the computer form paper 8; 52 a low stage paper feed cassette which can enclose about 2000 cut sheets of the fixed size; 53 an intermediate stage paper feed cassette in which cut sheets of a desired size are enclosed; and 56 an upper stage paper feed cassette in which cut sheets of a desired size are enclosed. The CFF 9 conveys the computer form paper 8 at a speed according to a copy magnification. A method of exposing the computer form paper while driving the CFF 9 as mentioned above is called a flow reading.

Figure 2:
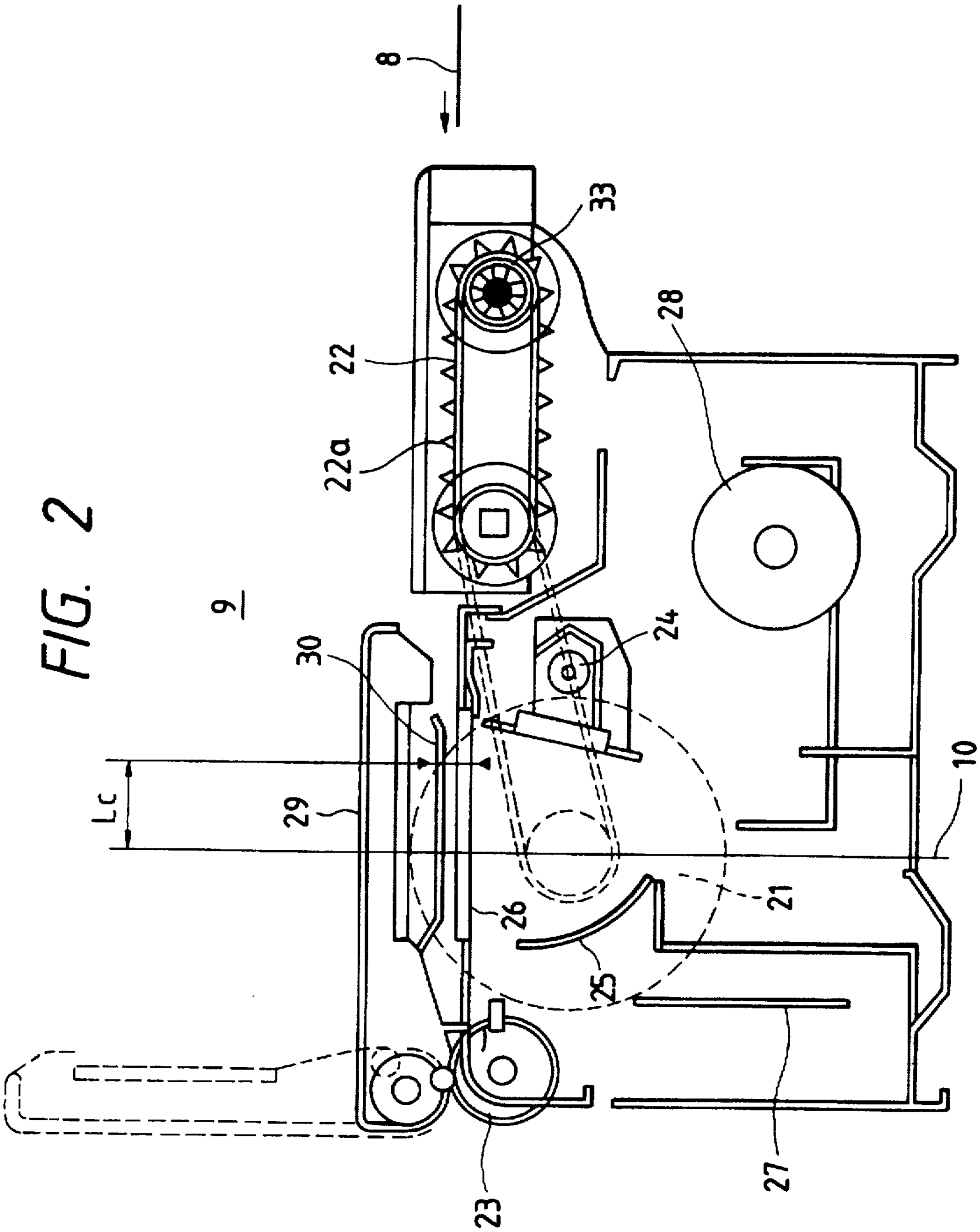
FIG. 2 is an enlarged cross sectional view for explaining a detailed construction of a computer form feeder CFF 9.
Figure 3:
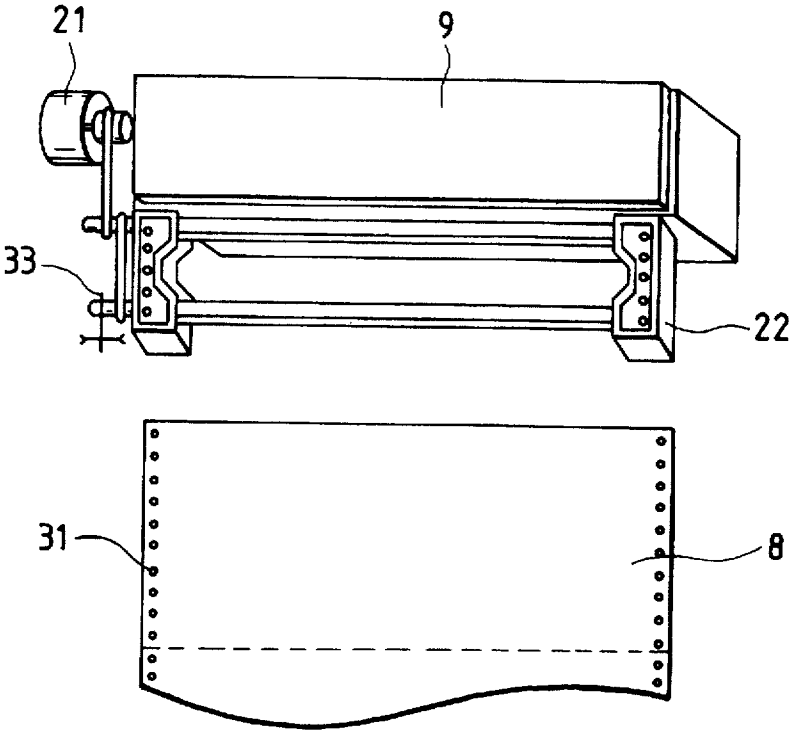
FIG. 3 is a perspective view for explaining a detailed construction of the CFF 9.
Figure 4:
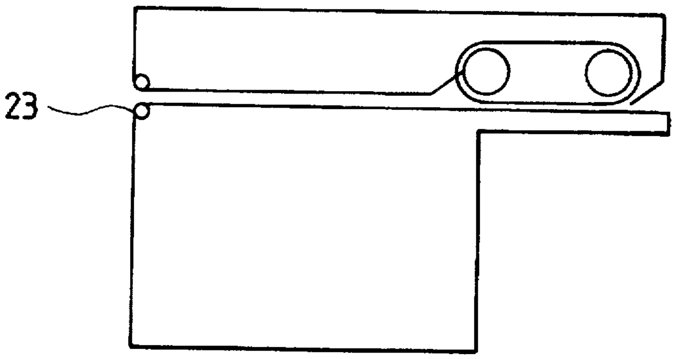
FIG. 4 is a cross sectional view for explaining a construction of the CFF 9.

FIGS. 2 to 4 are an enlarged cross sectional view of a main section, a perspective view, and a cross sectional view of a main section for explaining the detailed construction of the CFF 9 shown in FIG. 1, respectively.

In those diagrams, reference numeral 21 denotes a pulse driving motor (original feed driving motor) for driving a tractor 22 to convey the original by using convex portions 22*a* to engage conveying holes 31, which will be explained hereinlater, formed in the computer form paper 8; 23 indicates a delivery roller to deliver the computer form paper 8 after completion of the scanning operation of the original; and 24 a light source unit. The light emitted from the light source unit 24 is converging onto the computer form paper 8 by a converging plate 25. Reference numeral 26 denotes an original supporting glass and 27 a control board of the CFF 9. The control board 27 has a CFF controller, which will be explained hereinafter. Reference numeral 28 denotes a cooling fan to suppress an increase in temperature in the CFF 9; 29 an upper cover to press the computer form paper 8; 30 a sensor (photo interrupter) which is used to detect the original and a jam of the paper; 31 conveying holes which are used to convey the computer form paper 8; and 33 an encoder which is constructed by a disk and a photosensor which are attached to a drive shaft of the tractor 22. $L_c$ indicates an orthogonal distance between the sensor 30 and the light source 10.

Figure 5:
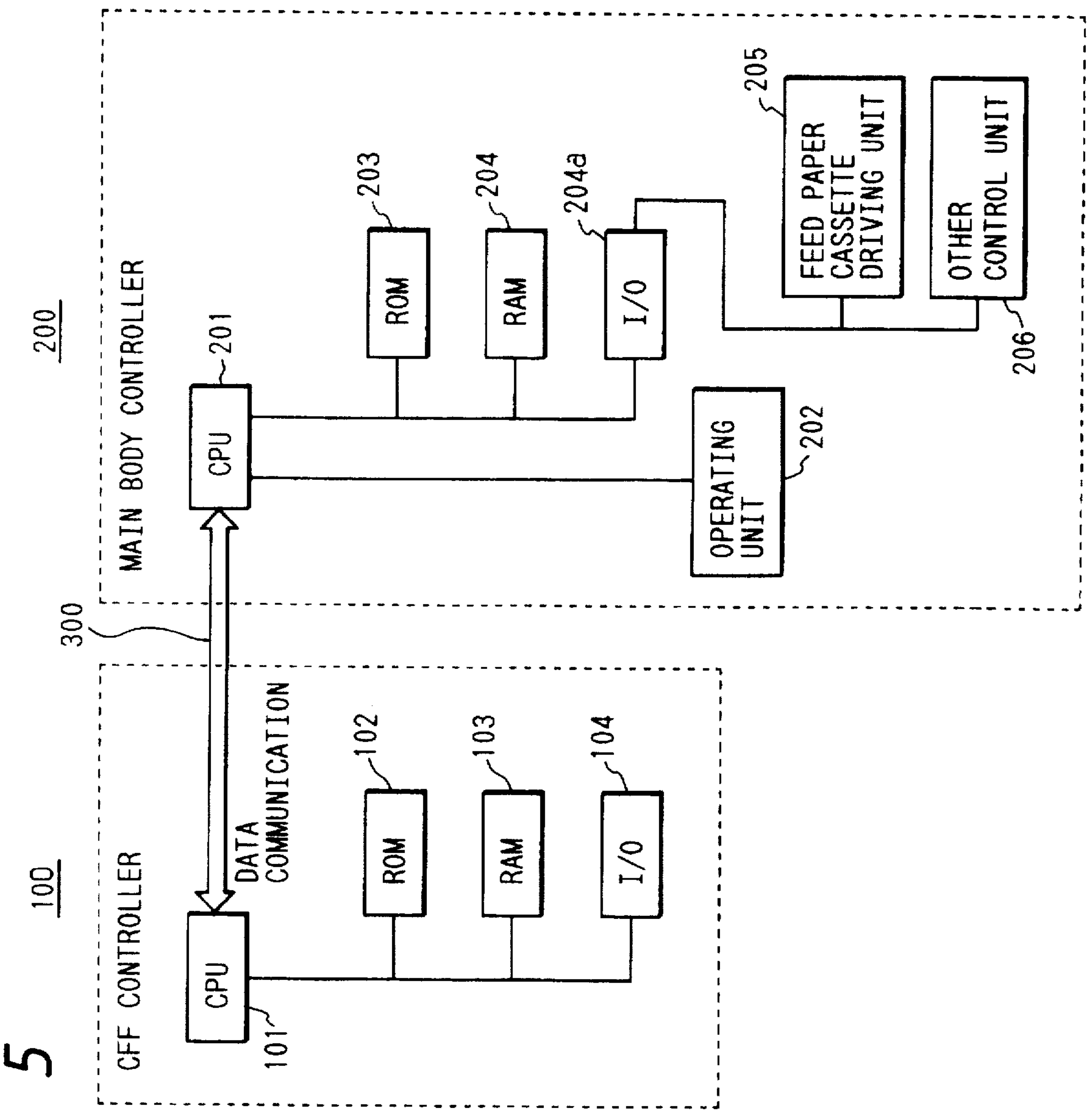
FIG. 5 is a block diagram for explaining control constructions of the CFF 9 and an image forming apparatus main body 1.

FIG. 5 is a block diagram for explaining control constructions of the CFF 9 and image forming apparatus main body 1 shown in FIG. 1.

Reference numeral 100 denotes a CFF controller having a CPU 101, an ROM 102, an RAM 103, and input/output interface (I/O) 104, and the like. CFF controller 100 communicates with a main body controller 200 through a communication cable 300.

The main body controller 200 has: a CPU 201; an operating unit 202; an ROM 203; an RAM 204; an input/output interface (I/O) 204*a*; a feed paper cassette driving unit 205; other control unit 206 including a high voltage control and the like. The main body controller 200 controls each section on the basis of control programs stored in the ROM 102.

In the image forming apparatus constructed as mentioned above, when a desired image forming range is set by the operating unit 202 and, further, image forming conditions are set by the operating unit 202, the CFF controller 100 conveys the computer form paper by a predetermined distance while controlling the conveying speed of the computer form paper which is conveyed by the tractor 22 on the basis of the set image forming range and image forming conditions. Thus, the image on the computer form paper is formed on the photosensitive drum 2 by the scanning mirrors 3 and 5, lens 4, and the like. The image on the drum 2 is developed by the charging unit, developing unit, copy transfer separating unit, and the like, thereby enabling the original image in a desired range in the computer form paper to be formed onto the cut sheet.

The whole control operation in the image forming apparatus will now be described hereinbelow with reference to a flowchart shown in FIG. 6.

Figure 6:
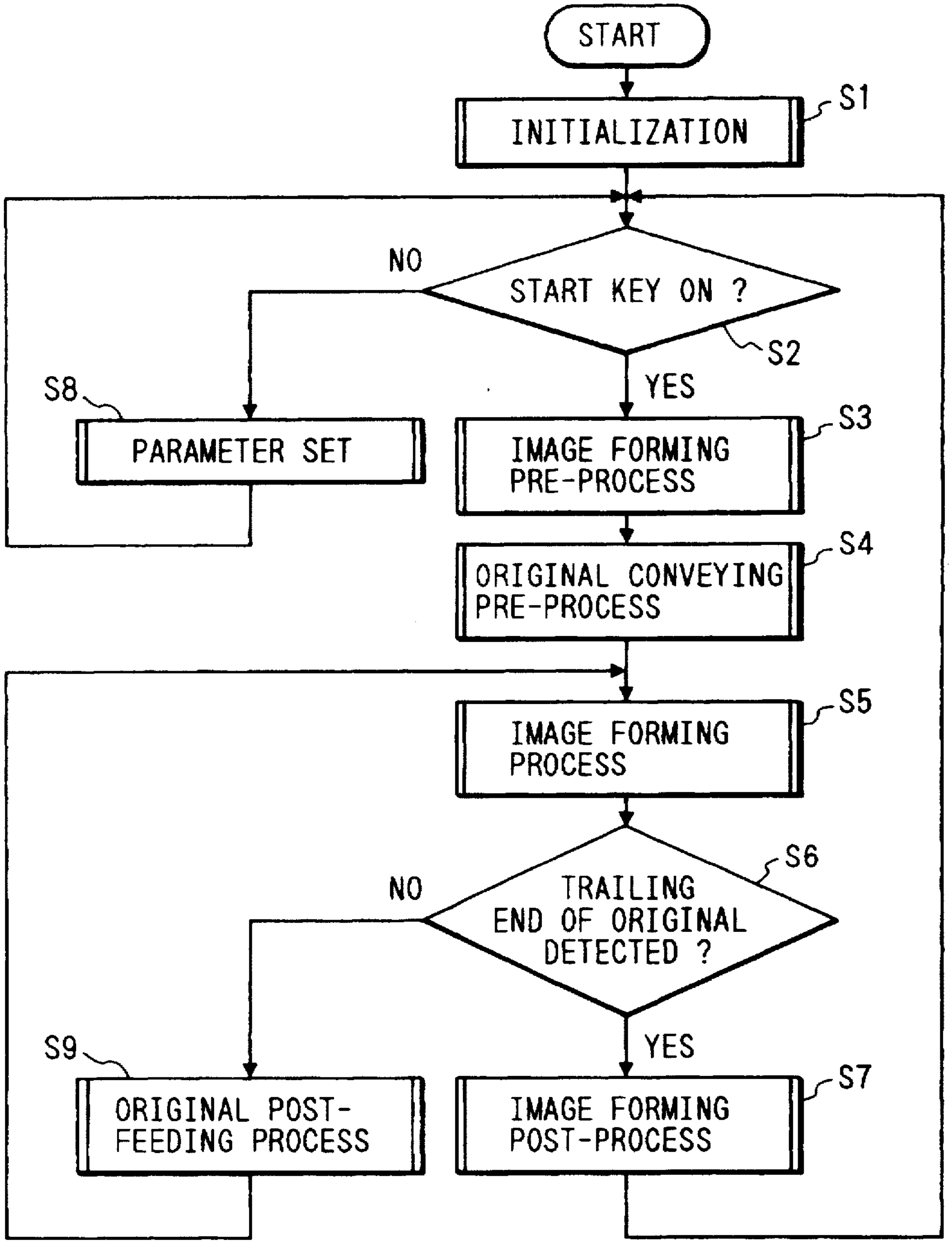
FIG. 6 is a flowchart for a whole image forming control according to the first embodiment.

FIG. 6 is the flowchart showing an example of the whole image forming control according to the first embodiment. S1 to S9 indicate processing steps.

First, an initializing routine (which will be explained in detail hereinlater) is executed (S1). A check is made to see if a start key in the operating unit 202 has been depressed or not (S2). If NO in step S2, step S8 follows and a parameter setting routine (which will be explained in detail hereinafter) is executed (S8). The processing routine is subsequently returned to step S2. If YES in step S2, an image forming pre-processing routine (which will be explained in detail hereinafter) is executed (S3). After completion of the image forming pre-processing routine, an original conveying pre-processing routine (which will be explained in detail hereinafter) is executed (S4). After completion of the original conveying pre-processing routine, an image forming processing routine (which will be explained in detail hereinafter) is executed (S5). After completion of the image forming processing routine, a check is made to see if the sensor 30 of the CFF 9 has detected a trailing end of the computer form paper or not (S6). If NO in step S6, step S9 follows and an original conveying post-feeding routine (which will be explained in detail hereinafter) is executed and the processing routine is returned to step S5. If YES in step S6, an image forming post-processing routine (which will be explained in detail hereinafter) is executed (S7) and the processing routine is returned to step S2.

Figure 7:
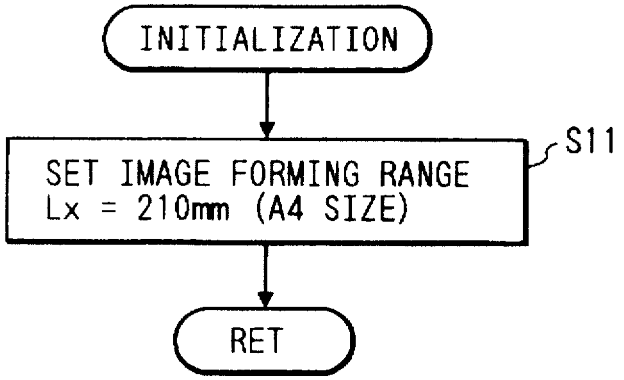
FIG. 7 is a detailed flowchart for an initializing routine (S1) shown in FIG. 6.

FIG. 7 is a detailed flowchart showing an example of the initializing routine (SI) shown in FIG. 6. SII indicates a processing step.

First, a length $L_x$ (210 mm at the A4 size) in the original conveying direction is set as an image forming range (S11) and the processing routine is finished.

Figure 8:
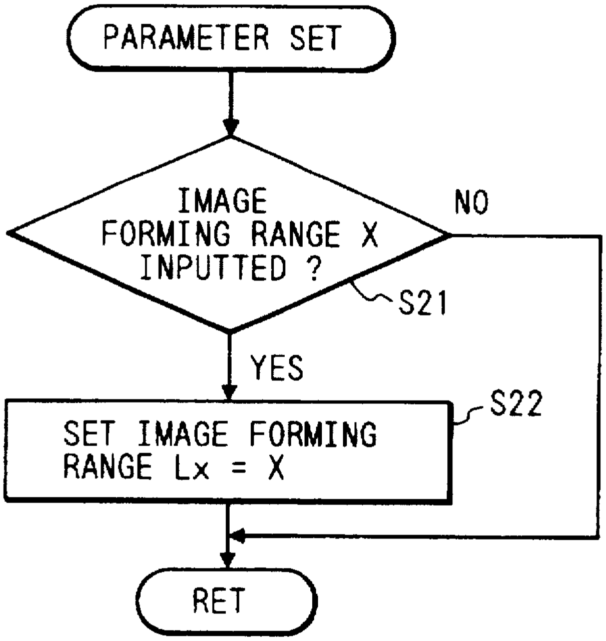
FIG. 8 is a detailed flowchart for a parameter setting routine (S8) shown in FIG. 6.

FIG. 8 is a detailed flowchart showing an example of the parameter setting routine (S8) shown in FIG. 6. S21 and S22 indicate processing steps.

First, a check is made to see if an image forming range X has been inputted or not (S21). If NO, the processing routine is finished. If YES, the length $L_x$ in the original conveying direction is changed on the basis of the inputted image forming range X (S22) and the processing routine is finished. Simultaneously with that the CFF 9 has been set into the main body and the computer form paper 8 has been set into the tractor 22 and it is detected that the upper cover 29 has been closed, the CFF 9 enters the operation enable state. The CFF 9 is controlled independently of the main body 1. The main body 1 detects by the communication that the CFF 9 is in the operation enable state, the main body enters a copy start enable state. As shown in FIG. 6, when the copy start key is depressed, the image forming range data is specified and parameters which are necessary for the image forming operation are set. At the same time, the pre-operations such as rotation of the cooling fan 28, movement of the lens according to the magnification in the main body, and the like which are executed before the image forming operation are executed by the image forming pre-processing routine.

Figure 9:
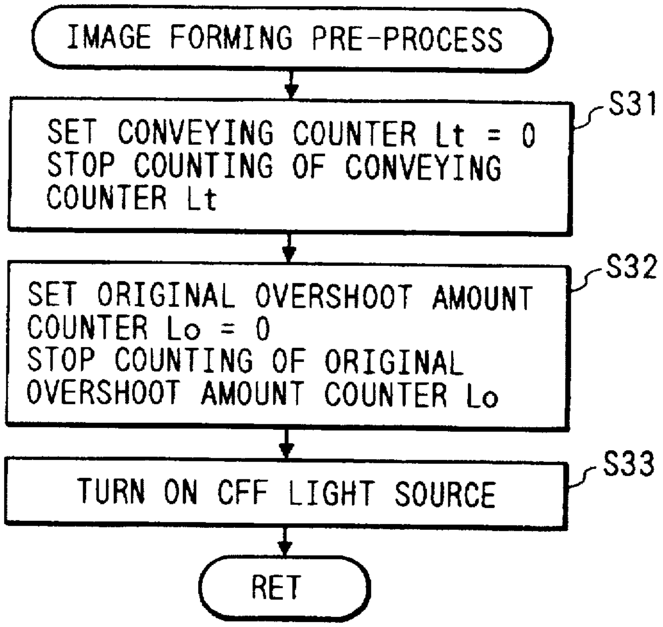
FIG. 9 is a detailed flowchart for an image forming pre-processing routine (S3) shown in FIG. 6.

FIG. 9 is a detailed flowchart showing an example of the image forming pre-processing routine (S3) shown in FIG. 6. S31 to S33 indicate processing steps.

First, a conveying counter $L_t$ to count the conveying distance of the original is stopped and the count value is cleared (S31). Subsequently, an original overshoot amount counter $L_o$ to count the overshoot amount of the original is similarly stopped and the count value is cleared (S32). Those count values are counted by the encoder 33 and can be converted into the conveying distance by multiplying proper constant values. After that, for the image forming operation, a light source of the light source unit 24 of the CFF 9 is turned on (S33). The image forming pre-process is finished and an original conveying pre-processing routine, which will be explained hereinafter, is executed.

Figure 10:
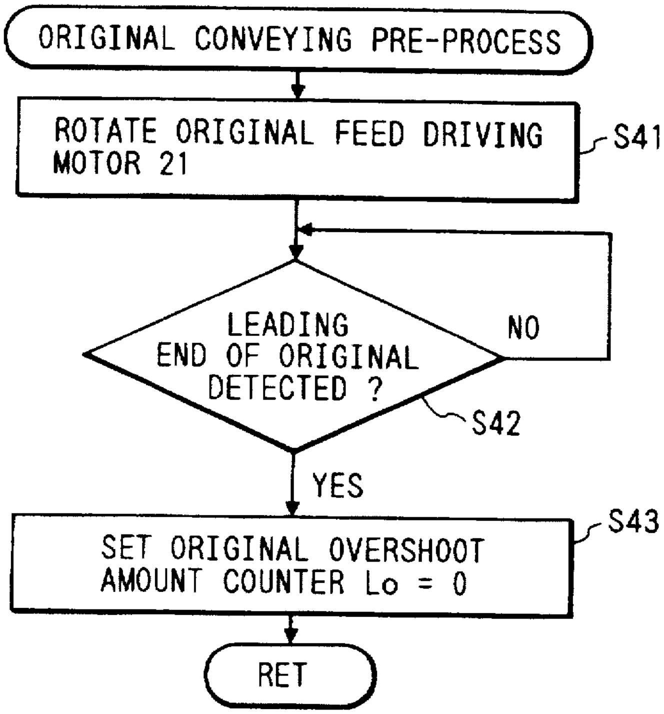
FIG. 10 is a detailed flowchart for an image conveying pre-processing routine (S4) shown in FIG. 6.

FIG. 10 is a flowchart showing an example of the original conveying pre-processing routine (S4) shown in FIG. 6. S41 to S43 indicate processing steps.

After completion of the process in step S3, the start of the image forming operation is communicated to the main body 1 and the conveyance of the computer form paper 8 is started. First, the tractor 22 connected by a timing belt or the like is rotated by the operation of the pulse driving motor 21, so that the computer form paper 8 is conveyed from the tractor 22 toward the original supporting glass 26 (S41). The computer form paper 8 is conveyed until it reaches the position of the photo interrupter 30 (S42). When the leading end of the computer form paper 8 is detected by the photo interrupter 30, the count value of the original overshoot amount counter $L_o$ is cleared (S43) and the processing routine is finished. An image forming processing routine shown in FIG. 11 is executed.

Figure 11:
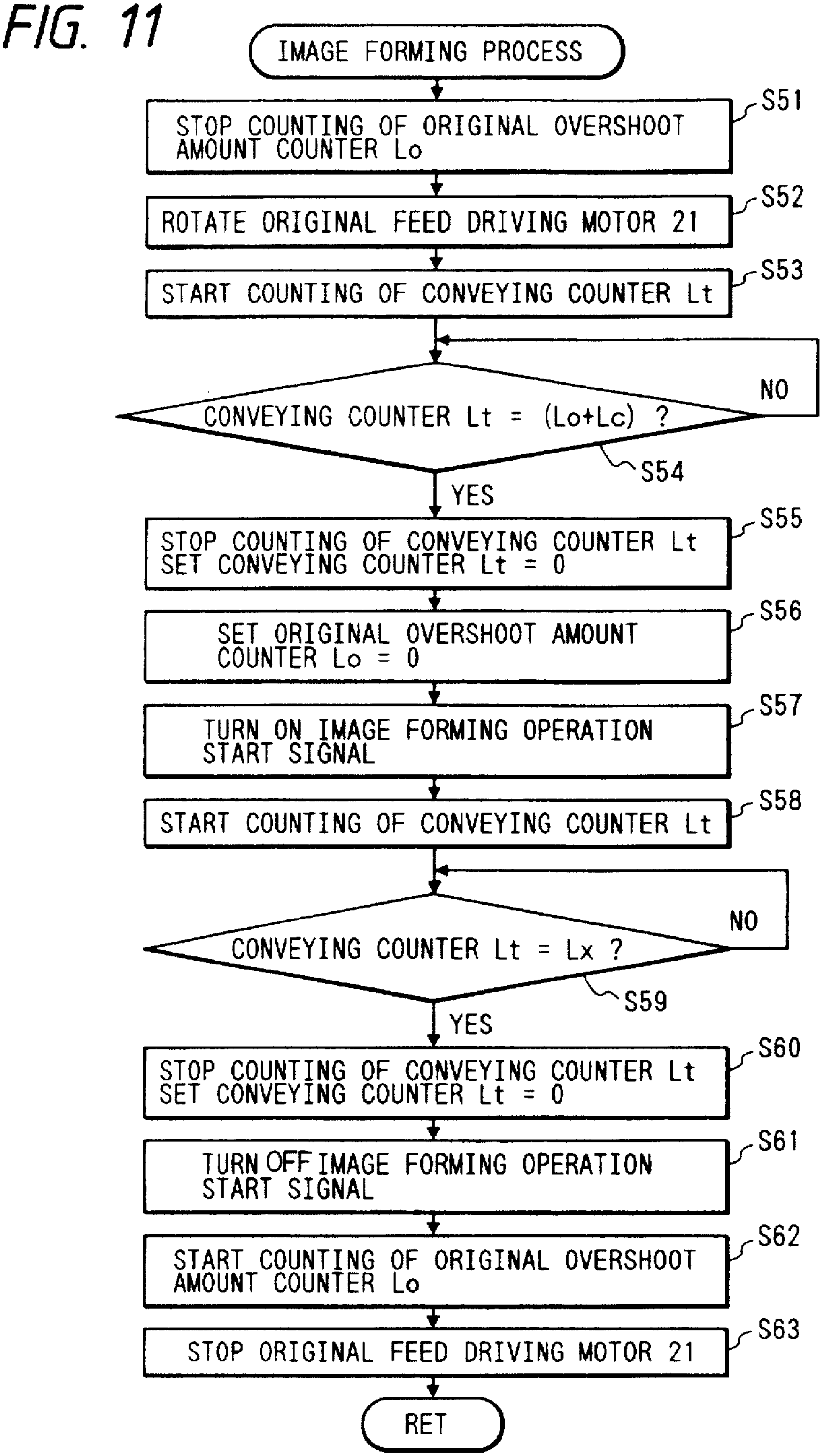
FIG. 11 is a detailed flowchart for an image forming processing routine (S5) shown in FIG. 6.

FIG. 11 is a detailed flowchart showing an example of the image forming processing routine (S5) shown in FIG. 6. S51 to S63 indicate processing steps.

Figure 13:
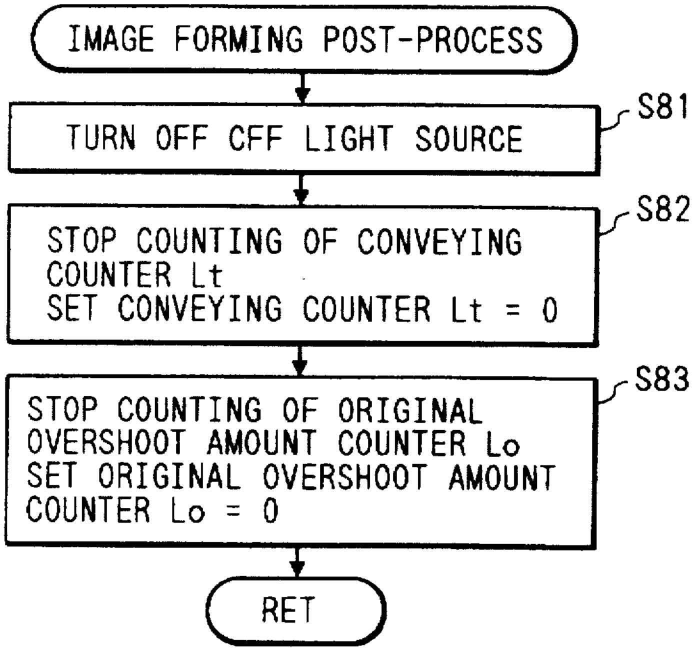
FIG. 13 is a detailed flowchart for an image forming post-processing routine (S7) shown in FIG. 6.

First, the counting-up operation of the original overshoot amount counter $L_o$ is stopped (S51). The original feed driving motor 21 is rotated in the conveying direction (forward direction) (S52). The counting operation of the conveying counter $L_t$ is started (S53). The original is conveyed until the count value of the conveying counter is equal to ($L_o$+$L_c$) (S54). In this instance, since the count value of the original overshoot amount counter $L_o$ is equal to "0" and the orthogonal distance $L_c$ has a constant value, the position corresponding to the count value ($L_o$+$L_c$) coincides with the position on the light path (on the line shown by a broken line in FIG. 2) indicated by the leading end of the original. In this instance, the counting operation of the conveying counter is stopped and the count value is cleared (S55). Subsequently, the count value of the original overshoot amount counter $L_o$ is also cleared (S56). An image forming operation signal for allowing the main body to perform the image forming operation is generated (S57). The reading operation of the computer form paper 8 is started. In this instance, the conveying speed of the computer form paper 8 is determined by the speed of the photosensitive drum 2 and the position of the lens 4. When the computer form paper 8 is read, the light emitted from the light source of the light source unit 24 is converged by the converging plate 25 and irradiated onto the computer form paper 8. The light reflected from the computer form paper 8 is transmitted through the first scanning mirror 3 and the second scanning mirror 5 and exposes the photosensitive drum 2, thereby reading the computer form paper 8. After that, the image of the computer form paper 8 is copied onto the cut sheet fed out from either one of the paper feed cassettes 52, 54, and 56 by the ordinary copying operations. The CFF 9 again starts the counting operation of the conveying counter $L_t$ (S58). The original is conveyed by the image forming range, namely, by the length $L_x$ in the original conveying direction (S59). An image forming operation start signal which has been supplied from the CFF controller 100 to the main body 1 is turned off (S61). In response to this signal, the main body 1 finishes the image forming operation of one sheet. The counting operation of the original overshoot amount counter $L_o$ is started (S62). At the same time, the original feed driving motor 21 is stopped (S63) and the processing routine is finished. On the basis of the count value of the original overshoot amount counter $L_o$, the overshoot amount of the original from the stop of the original feed driving motor 21 is measured. Namely, in the image formation which is continued, the conveying direction of the original is reversed and the original is returned by the distance of the overshoot amount. After that, the conveying direction of the original is set to the forward direction and the rotation is forwardly performed and the image formation is started. The image is formed in the image forming range set as mentioned above. After completion of the image forming operation, a check is made to see if the trailing end of the original has been detected by the sensor 30 or not in step S6 in FIG. 6. If NO in step S6, namely, when the trailing end of the computer form paper 8 is not detected yet, an original post-feed processing routine, which will be explained hereinafter, is executed. If YES in step S6, an image forming post-processing routine shown in FIG. 13 is executed.

Figure 12:
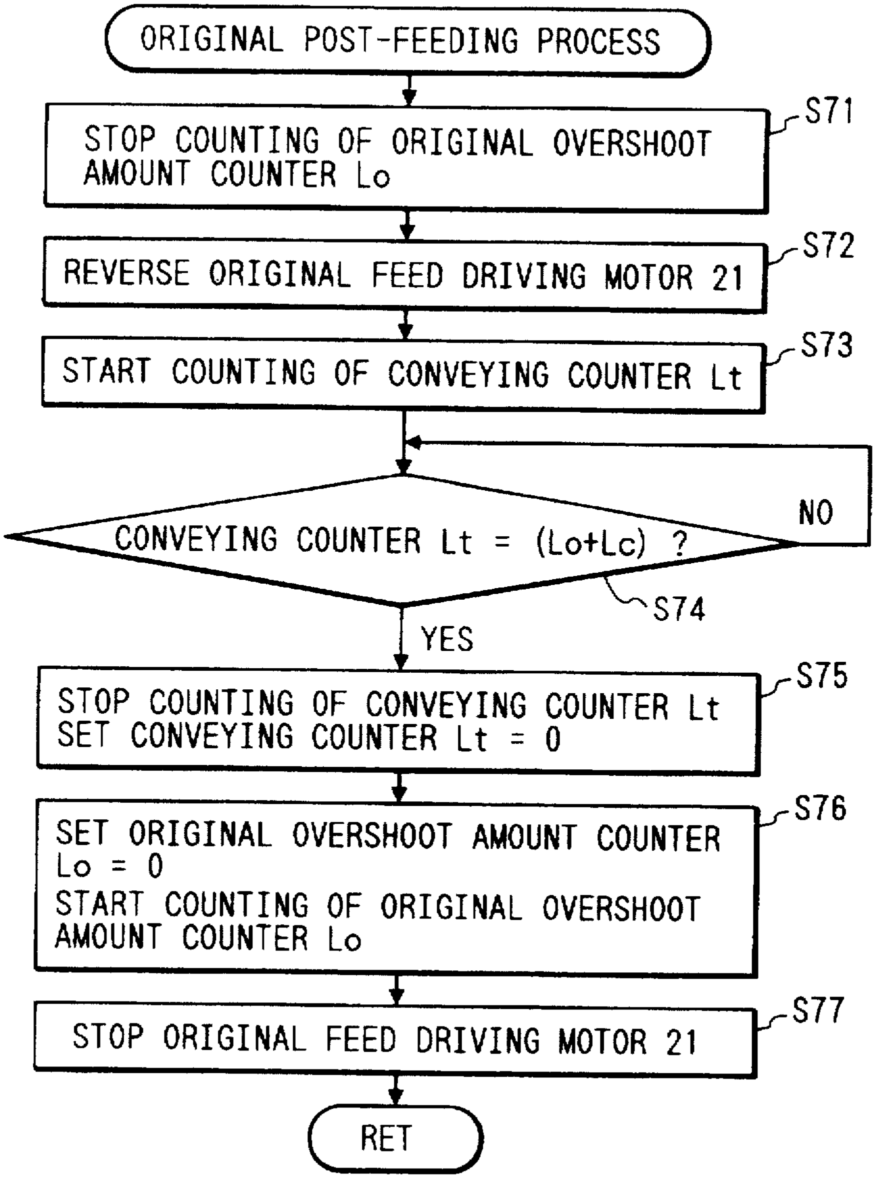
FIG. 12 is a detailed flowchart for an original post-feeding processing routine (S9) shown in FIG. 6.

FIG. 12 is a detailed flowchart showing an example of the original post-feed processing routine (S9) shown in FIG. 6. S71 to S77 indicate processing steps.

First, the counting operation of the original overshoot amount counter $L_o$ is stopped (S71), thereby specifying the original overshoot amount. The original feed driving motor 21 is rotated in the reverse conveying direction (S72). At the same time, the counting operation of the conveying counter $L_t$ is started (S73). The computer form paper 8 is conveyed in the reverse direction until the count value of the conveying counter $L_t$ coincides with ($L_o$+$L_c$) (S74). Thus, the computer form paper is reversely conveyed by the added distance of the counted overshoot amount distance and the orthogonal distance $L_c$. Namely, the boundary between the image forming range of the computer form paper 8 and the remainder of the computer form paper 8 is located over the sensor 30. The counting operation of the conveying counter $L_t$ is stopped and the count value is cleared (S75). The count value of the original overshoot amount counter $L_o$ is cleared. After that, simultaneously with the start of the counting operation of the original overshoot amount counter $L_o$ (S76), the original feed driving motor 21 is stopped (S77). The processing routine is finished. On the basis of the count value of the original overshoot amount counter $L_o$, the overshoot amount to the original in the reverse conveying direction from the stop of the original feed driving motor 21 is measured. As mentioned above, the original post-feed process is finished and the processing routine is returned to step S5 shown in FIG. 6. In step S51 shown in FIG. 11, the original overshoot amount counter $L_o$ is counted up and the original feed driving motor 21 is rotated in the conveying direction (S52). The counting operation of the conveying counter $L_t$ is started and the computer form paper is conveyed until the count value coincides with ($L_o$+$L_c$). $L_o$ in this instance is equal to the count value in steps S76 and S77. Namely, when the count value of the conveying counter $L_t$ is equal to ($L_o$+$L_c$), the boundary between the image formed range of the original and the image unformed range is located over the light path 10. After that, the counting operation of the conveying counter $L_t$ is stopped and the count value is cleared in step S55 shown in FIG. 11. The count value of the original overshoot amount counter $L_o$ is cleared in step S56. After that, processes similar to those mentioned above are executed.

In step S6 shown in FIG. 6, the image forming operation is continuously executed until the trailing end of the computer form paper 8 is detected as mentioned above. When the trailing end of the computer form paper 8 is detected, an image forming post-processing routine shown in FIG. 13 is executed.

FIG. 13 is a detailed flowchart showing an example of the image forming post-processing routine (S7) shown in FIG. 6. S81 to S83 indicate processing steps.

First, the light source of the light source unit 24 of the CFF 9 is turned off (S81). The counting operation of the conveying counter $L_t$ is stopped and the count value is cleared (S82). Subsequently, the counting operation of the original overshoot amount counter $L_o$ is stopped and the count value is cleared (S83). The processing routine is finished.

[Second embodiment]

The first embodiment has been described above with respect to the image forming processing operation having the setting function of the image forming range. According to the second embodiment, however, in addition to the setting function of the image forming range, by combining magnification data upon image formation, the paper can be automatically selected in correspondence to the image forming range in the flow reading mode.

Figure 14:
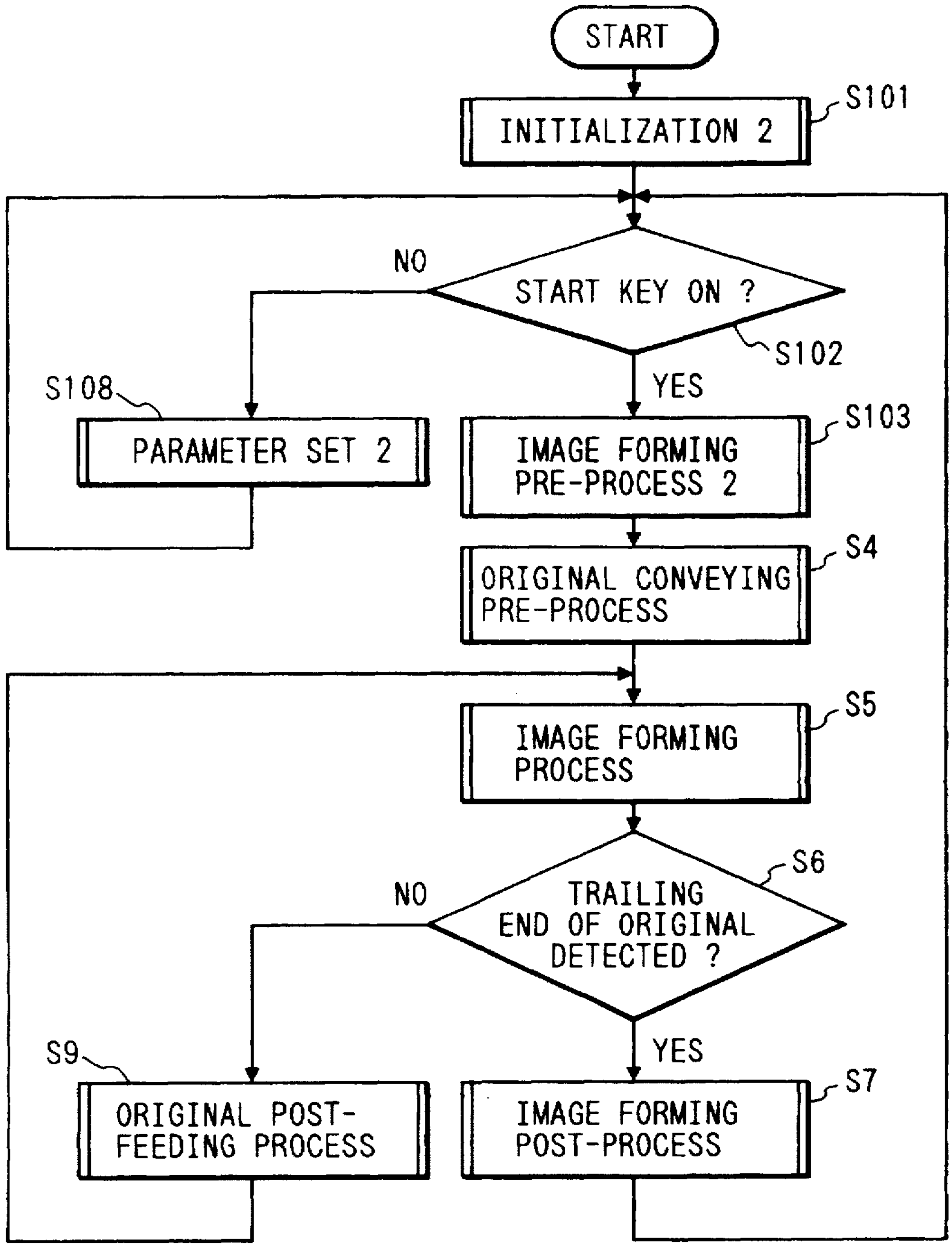
FIG. 14 is a flowchart for a whole image forming control according to the second embodiment of the present invention.

FIG. 14 is a flowchart showing an example of the whole image forming control according to the second embodiment of the invention. S4 to S7, S9, S101 to S103, and S108 indicate processing steps.

First, an initializing routine 2 (which will be explained in detail hereinbelow) is executed (S101). A check is made to see if the start key in the operating unit 202 has been depressed or not (S102). If NO, step S108 follows and a parameter setting routine 2 (which will be explained in detail hereinbelow) is executed (S108) and the processing routine is returned to step S102. If YES in step S102, an image forming pre-processing routine 2 (which will be explained in detail hereinbelow) is executed (S103). After completion of the image forming pre-processing routine 2, the foregoing original conveying pre-processing routine is executed (S4). After completion of the original conveying pre-processing routine, the foregoing image forming processing routine is executed (S5). After completion of the image forming processing routine, a check is made to see if the trailing end of the computer form paper 8 has been detected by the sensor 30 of the CFF 9 or not (S6). If NO in step S6, step S9 follows and the foregoing original conveying post-feeding routine is executed and the processing routine is returned to step S5. If YES in step S6, the foregoing image forming post-processing routine is executed (S7) and the processing routine is returned to step S102.

Figure 15:
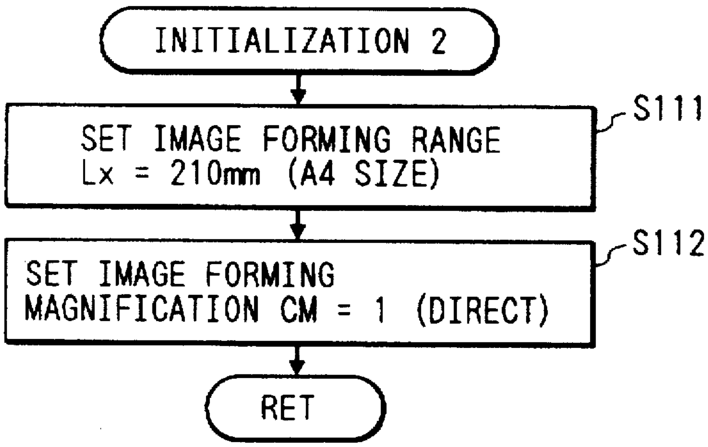
FIG. 15 is a detailed flowchart for an initializing routine 2 (S101) shown in FIG. 14.

FIG. 15 is a detailed flowchart showing an example of the initializing routine 2 shown in FIG. 14. S111 and S112 indicate processing steps.

First, the length $L_x$ (210 mm at the A4 size) in the original conveying direction is set as an image forming range (S111). Subsequently, "1" (in case of the direct copy: equal magnification) is set as a value of an image forming magnification CM (S112) and the processing routine is finished.

After completion of the initialization in accordance with the flowchart shown in FIG. 14, the CFF controller 100 always monitors whether the image forming range and the image forming magnification data have newly been sent as communication data from the main body or not until the copy start key is depressed and the copying operation is started. When they are sent, the data is updated.

Figure 16:
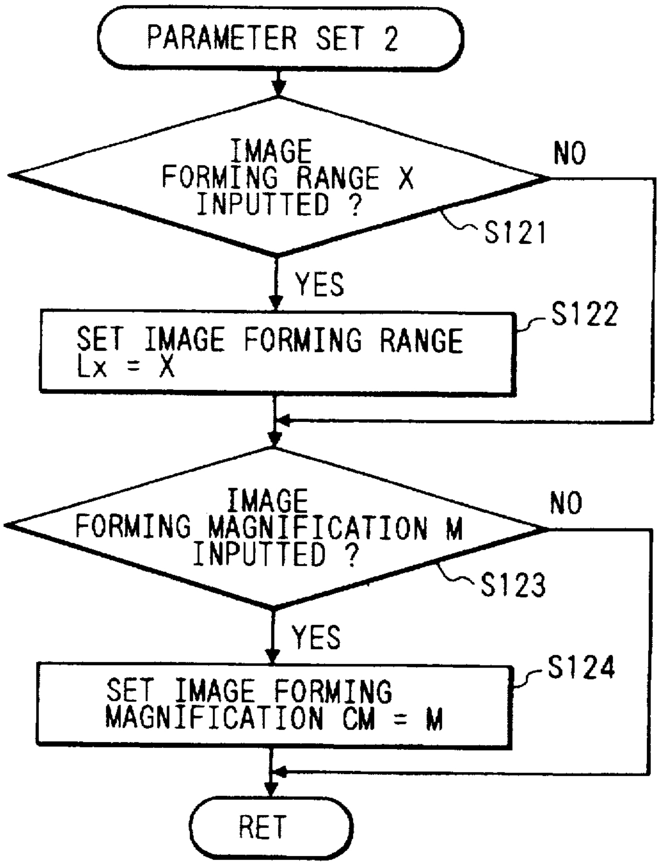
FIG. 16 is a detailed flowchart for a parameter setting routine 2 (S108) shown in FIG. 14.

FIG. 16 is a detailed flowchart showing an example of the parameter setting routine 2 shown in FIG. 14. S121 to S124 indicate processing steps.

First, a check is made to see if an image forming range X has been inputted or not (S121). If NO, the processing routine advances to step S123 and subsequent steps. If YES, the length $L_x$ in the original conveying direction is changed on the basis of the inputted image forming range X (S122). Similarly, a check is made to see if an image forming magnification M has been inputted or not (S123). If NO, the processing routine is finished. If YES, the image forming magnification data variable CM is updated (S124) and the processing routine is finished.

Simultaneously with that the CFF 9 has been set into the main body 1 and the computer form paper 8 has been set to the tractor 22 and it is detected that the upper cover 29 has been closed, the CFF 9 enters an operation enable state. The CFF 9 is controlled independently of the main body 1. The main body 1 detects by the communication that the CFF 9 enters the operation enable state, so that the main body 1 enters a copy start enable state. In this state, when the copy start key of the main body 1 is depressed, the image forming range data is specified. When the parameters which are necessary for the image forming operation are set, the pre-operations such as rotation of the cooling fan 28, movement of the lens 4 according to the magnification in the main body, and the like which are executed before the image forming operation are executed in accordance with a flowchart shown in FIG. 17.

Figure 17:
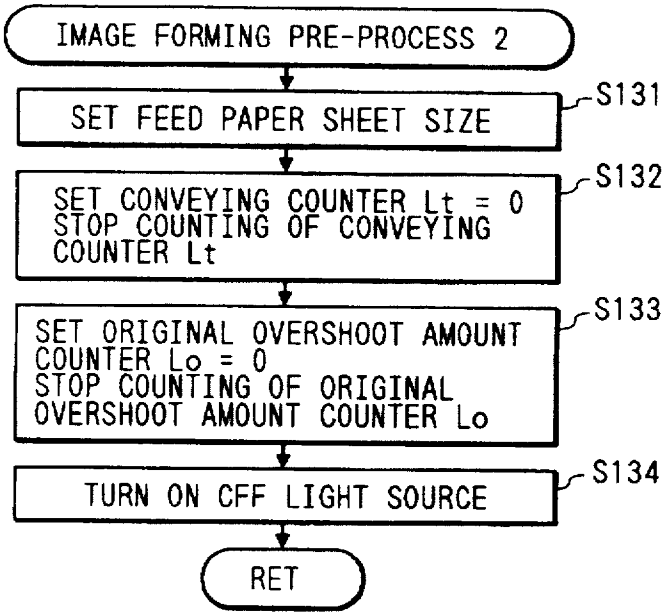
FIG. 17 is a detailed flowchart for an image forming pre-processing routine 2 (S103) shown in FIG. 14.

FIG. 17 is the detailed flowchart showing an example of the image forming pre-processing routine 2 (S103) shown in FIG. 14. S131 to S134 indicate processing steps.

First, there is executed a paper feed sheet size setting routine to set the size of cut sheet on which an image should be formed (which will be explained in detail hereinafter) (S131). Each size of the cut sheets enclosed in the paper feed cassettes of the main body has previously been transmitted to the CFF controller 100 of the CFF 9 by a communication or the like. On the basis of the cut sheet size data, the cassette stage to feed the paper is selected. The result of the selection regarding the cassette stage is transmitted from the CFF 9 to the main body 1. In the main body 1, the paper is fed from the selected paper feed cassette stage.

The counting operation of the conveying counter $L_t$ to count the conveying distance of the original is stopped and the count value is cleared (S132). Subsequently, the counting operation of the original overshoot amount counter $L_o$ to count the original overshoot amount is similarly stopped and the count value is cleared (S133). Those counters are counted by the encoder 33 and can be converted into the conveying distance by multiplying proper constant values. After that, the light source of the light source unit 24 of the CFF 9 is turned on (S134) for the image forming operation. The image forming pre-process is finished and an image conveying pre-processing routine, which will be explained hereinlater, is executed.

Figure 18:
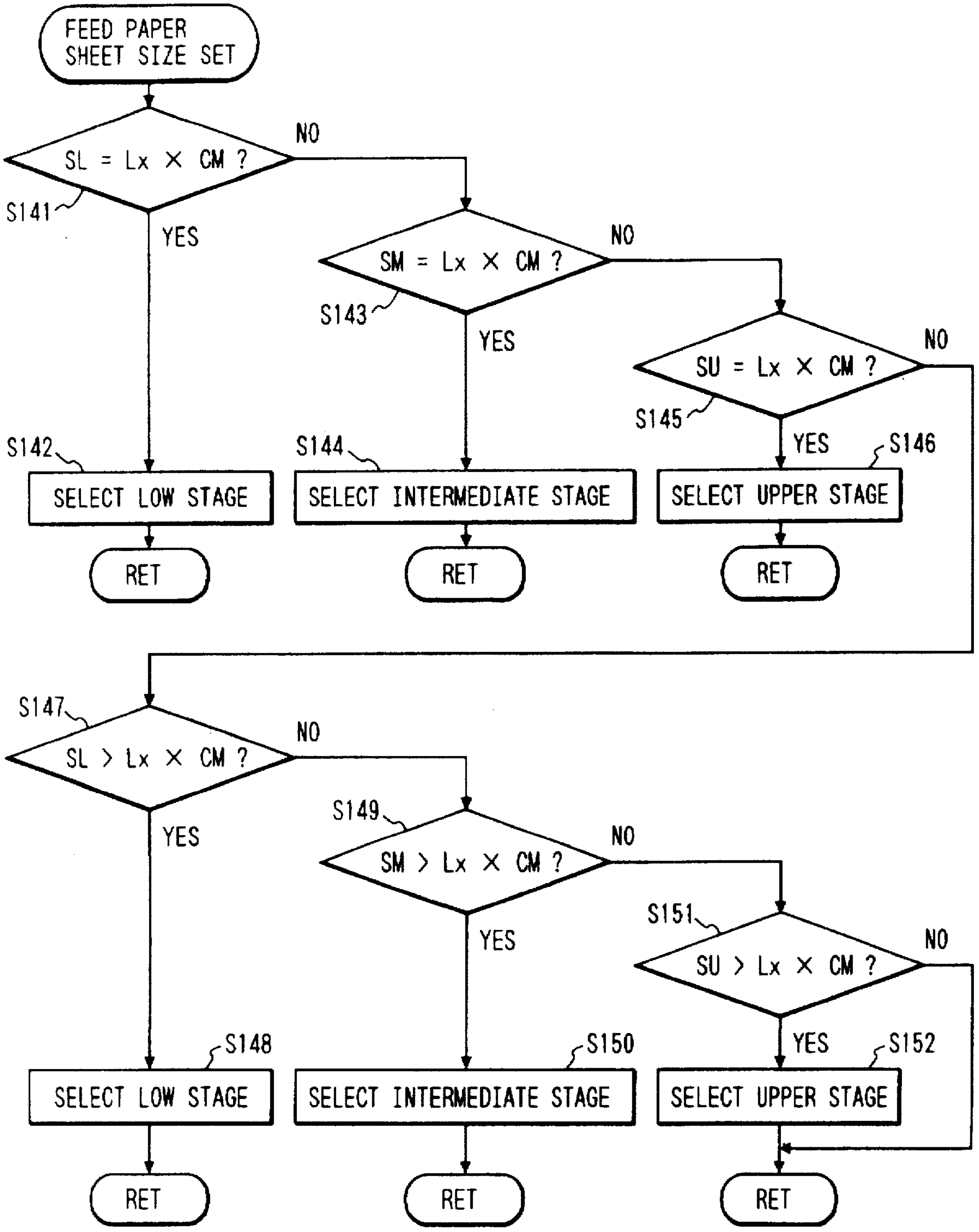
FIG. 18 is a detailed flowchart for a paper feed sheet size setting routine (S131) shown in FIG. 17.

FIG. 18 is a detailed flowchart showing an example of the paper feed sheet size setting routine shown in FIG. 17. S141 to S152 indicate processing steps.

In the diagram, $L_x$: image forming range (length in the conveying direction)

CM: image forming magnification

SL: length in the conveying direction of the sheet in the low stage paper feed cassette section SM: length in the conveying direction of the sheet in the intermediate paper feed cassette section SU: length in the conveying direction of the sheet in the upper stage paper feed cassette The size of the image which is formed (forming image size) is determined by $L_x$×CM. SL, SM, and SU are hereinafter simply called sizes.

First, to select the sheet stage of the same size as the size of image, a check is made to see if the image size ($L_x$×CM) is equal to the size SL or not (S141). If YES, the low stage paper feed cassette section is selected (S142) and the processing routine is finished. If NO, a check is made to see if the image size ($L_x$×CM) is equal to the size SM or not (S143). If YES, the intermediate stage paper feed cassette section is selected (S144) and the processing routine is finished. If NO, a check is made to see if the image size ($L_x$×CM) is equal to the size SU or not (S145). If YES, the upper stage paper feed cassette section is selected (S146) and the processing routine is finished.

On the other hand, when the paper feed cassette section of the size which coincides with the image size ($L_x$×CM) does not exist in each of steps S141, S143, and S145, a check is made to see if the image size ($L_x$×CM) is smaller than the size SL or not (S147) in order to select the cassette containing papers on which the image will fit have been enclosed. If YES in step S147, the low stage paper feed cassette section is selected (S148) and the processing routine is finished. If NO, a check is made to see if the image size ($L_x$×CM) is smaller than the size SM or not (S149). If YES in step S149, the intermediate stage paper feed cassette section is selected (S150) and the processing routine is finished. If NO, a check is made to see if the image size ($L_x$×CM) is smaller than the size SU or not (S151). If NO in step S151, the processing routine is finished. If YES, the upper stage paper feed cassette section is selected (S152) and the processing routine is finished.

[Third embodiment]

The second embodiment has been described above with respect to the case of forming the image of the computer form paper 8 which is conveyed from the CFF 9 by the combination of the magnification data and the image forming range. According to the third embodiment, however, the image forming magnification in the flow reading mode can be selected by combining with the size data of the image forming sheet paper.

Figure 19:
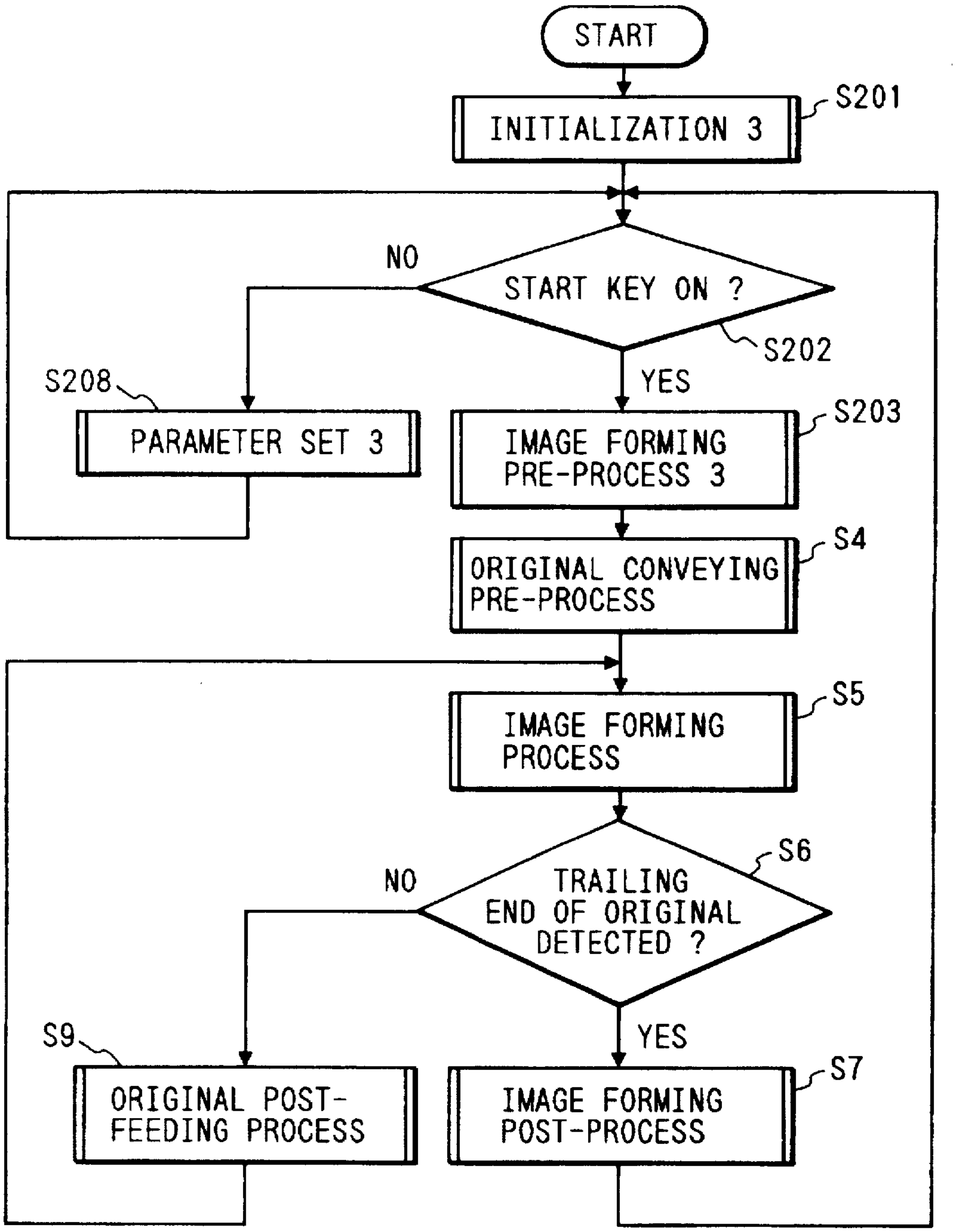
FIG. 19 is a flowchart for a whole image forming control according to the third embodiment of the present invention.

FIG. 19 is a flowchart showing an example of the whole image forming control according to the third embodiment of the present invention. S4 to S7, S9, S201 to S203, and S208 indicate processing steps.

First, an initializing routine 3 (which will be explained in detail hereinafter) is executed (S201). A check is made to see if the start key in the operating unit 202 has been depressed or not (S202). If NO, the processing routine advances to step S208 and a parameter setting routine 3 (which will be explained in detail hereinafter) is executed (S208) and the processing routine is returned to step S202. If YES, an image forming pre-processing routine 3 (which will be explained in detail hereinafter) is executed (S203). After completion of the image forming pre-processing routine, the foregoing original conveying pre-processing routine is executed (S4). After completion of the original conveying pre-processing routine, the foregoing image forming processing routine is executed (S5). After completion of the image forming processing routine, a check is made to see if the sensor 30 of the CFF 9 has detected the trailing end of the computer form paper 8 or not (S6). If NO, step S9 follows and the foregoing original conveying post-feeding routine is executed and the processing routine is returned to step S5. If YES in step S6, the foregoing image forming post-processing routine is executed (S7) and the processing routine is returned to step S202. The CFF 9 can obtain by the communication the size data of the cut sheets enclosed in the low stage paper feed cassette 52, intermediate stage paper feed cassette 53, and upper stage paper feed cassette 56 in the main body, respectively.

Figure 20:
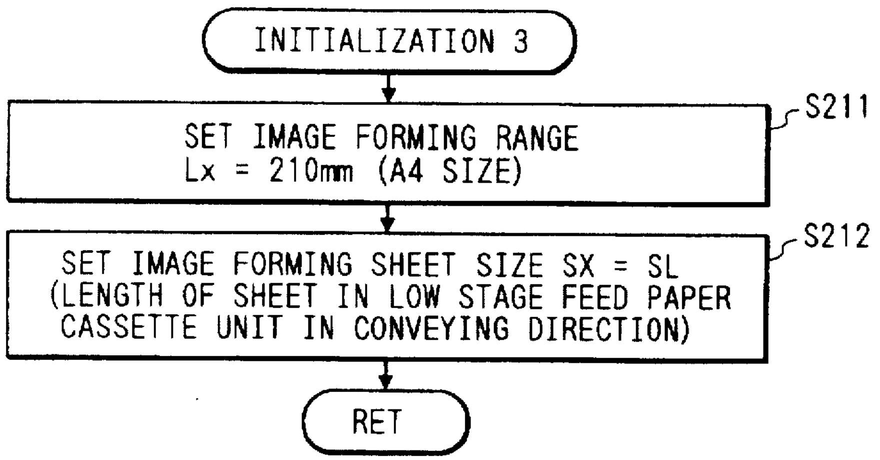
FIG. 20 is a detailed flowchart of an initializing routine 3 (S201) shown in FIG. 19.

FIG. 20 is a detailed flowchart showing an example of the initializing routine 3 (S201) shown in FIG. 19. S211 and S212 indicate processing steps.

First, the length $L_x$ (210 mm at the A4 size) in the original conveying direction is set as an image forming range (S211). Subsequently, the sheet size of the low stage paper feed cassette is set into a variable SX of the image forming sheet size as an initial value of the image forming sheet size (S212) and the processing routine is finished. After the initialization was finished in accordance with the flowchart shown in FIG. 19, the CFF controller 100 always monitors whether the image forming range and the image forming sheet size data have been sent as communication data from the main body or not until the copy start key is depressed and the copying operation is started. When they are sent, the data is updated.

Figure 21:
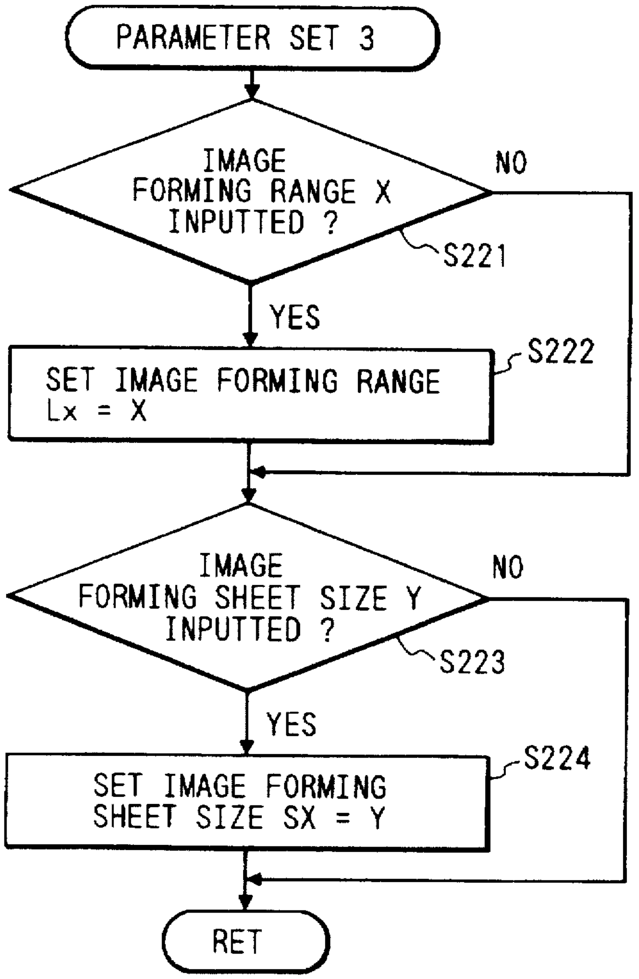
FIG. 21 is a detailed flowchart for a parameter setting routine 3 (S208) shown in FIG. 19.

FIG. 21 is a detailed flowchart showing an example of the parameter setting routine 3 (S208) shown in FIG. 19. S221 to S224 indicate processing steps.

First, a check is made to see if the image forming range X has been inputted or not (S221). If NO, the processing routine advances to step S223 and subsequent steps. If YES, the length $L_x$ in the original conveying direction is changed on the basis of the inputted image forming range X (S222). Subsequently, similarly, a check is made to see if the image forming sheet size Y has been inputted or not (S223). If NO, the processing routine is finished. If YES, the image forming sheet size SX is updated (S224) and the processing routine is finished.

Simultaneously with that the CFF 9 has been set into the main body and the computer form paper 8 has been set to the tractor 22 and it is detected that the upper cover 29 has been closed, the CFF 9 enters the operation enable state. The CFF 9 is controlled independently of the main body 1. The main body 1 detects by the communication that the CFF 9 has entered the operation enable state, so that the main body enters the copy start enable state. In this state, when the copy start key of the main body 1 is depressed, the image forming range data is specified. When the parameters which are necessary for the image forming operation are set, the pre-operations such as rotation of the cooling fan 28, movement of the lens 4 according to the magnification in the main body, and the like which are executed before the image forming operation are executed in accordance with a flowchart shown in FIG. 22.

Figure 22:
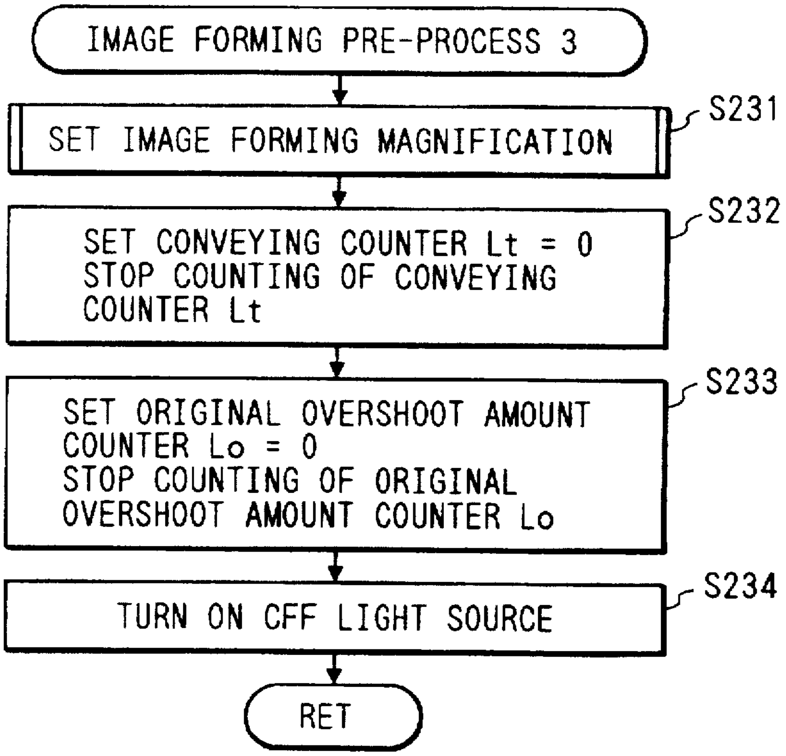
FIG. 22 is a flowchart for an image forming pre-processing routine 3 (S203) shown in FIG. 19.

FIG. 22 is the flowchart showing an example of the image forming pre-processing routine 3 (S203) shown in FIG. 19. S231 to S234 indicate processing steps.

First, an image forming magnification setting routine (which will be explained in detail hereinafter) to set the magnification upon image formation is executed (S231). The result of the selection is transmitted from the CFF 9 to the main body 1. The pre-operations such as movement of the lens 4 of the main body and the like are started.

The counting operation of the conveying counter $L_f$ to count the conveying distance of the original is stopped and the count value is cleared (S232). Subsequently, the counting operation of the original overshoot amount counter $L_o$ to count the overshoot amount of the original is similarly stopped and the count value is cleared (S233). Those counters are counted by the encoder 33 and can be converted into the conveying distance by multiplying proper constant values, respectively. After that, the light source of the light source unit 24 of the CFF 9 is turned on (S234) for the image forming operation. The image forming pre-process is finished and an image conveying pre-processing routine, which will be explained hereinafter, is executed.

Figure 23:
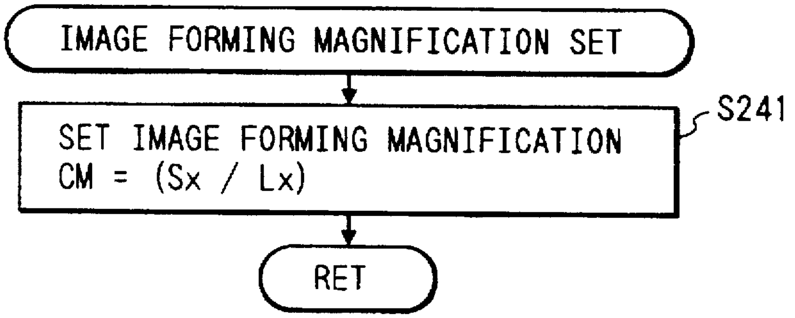
FIG. 23 is a flowchart for an image forming magnification setting routine (S231) shown in FIG. 22.

FIG. 23 is a flowchart showing an example of the image forming magnification setting routine (S231) shown in FIG. 22. S241 indicates a processing step.

In the diagram, $L_x$: image forming range (length in the conveying direction)

$S_x$: image forming sheet size (length in the conveying direction)

CM: image forming magnification.

The magnification CM upon image formation is determined by $S_x/L_x$ (S241) and the processing routine is finished.

In the image formation, the CFF 9 conveys the computer form paper 8 at the speed corresponding to the magnification CM. Due to this, a reduction or magnification is executed.

[Fourth embodiment]

The third embodiment has been described above with respect to the case of forming the image of the computer form paper 8 which is conveyed from the CFF 9 by the combination of the image forming sheet size and the image forming range. According to the fourth embodiment, however, the image forming range in the flow reading mode can be automatically set by combining the size data of the image forming sheet paper and the image forming magnification.

Figure 24:
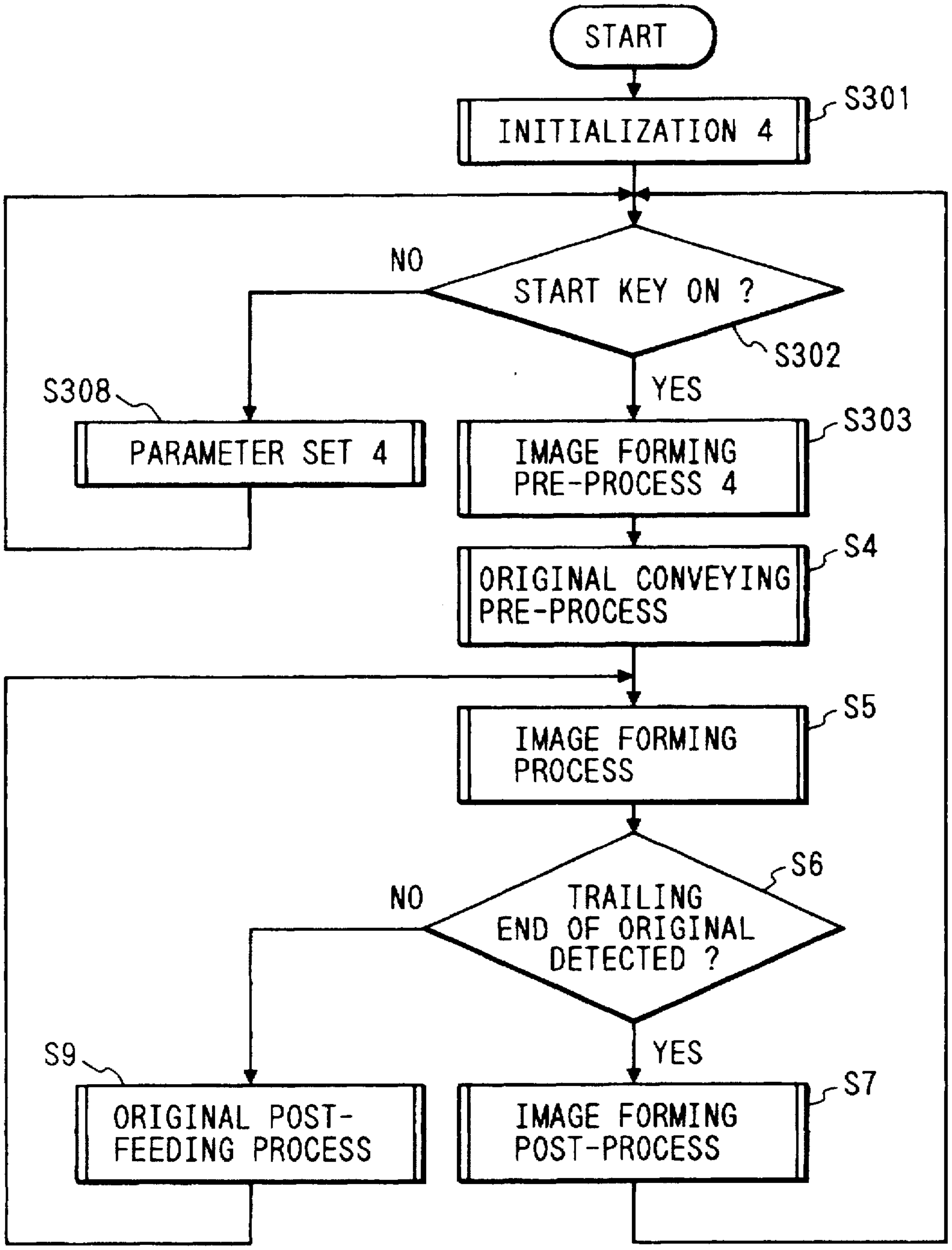
FIG. 24 is a flowchart for a whole image forming control according to the fourth embodiment of the present invention.

FIG. 24 is a flowchart showing an example of the whole image forming control according to the fourth embodiment of the invention. S4 to S7, S9, S301 to S303, and S308 indicate processing steps.

First, an initializing routine 4 (which will be explained in detail hereinlater) is executed (S301). A check is made to see if the start key in the operating unit 202 has been depressed or not (S302). If NO, step S308 follows and a parameter setting routine 4 (which will be explained in detail hereinafter) is executed (S308). The processing routine is returned to step S302. If YES, an image forming pre-processing routine 4 (which will be explained hereinafter) is executed (S303). After completion of the image forming pre-processing routine, the foregoing original conveying pre-processing routine is executed (S4). After completion of the original conveying pre-processing routine, the foregoing image forming processing routine is executed (S5). After completion of the image forming processing routine, a check is made to see if the sensor 30 of the CFF 9 has detected the trailing end of the computer form paper 8 or not (S6). If NO, step S9 follows and the foregoing original conveying post-processing routine is executed and the processing routine is returned to step S5. If YES in step S6, the image forming post-processing routine is executed (S7) and the processing routine is returned to step S302. The CFF 9 can obtain by the communication the size data of the cut sheets enclosed in the low stage paper feed cassette 52, intermediate stage paper feed cassette 53, and upper stage paper feed cassette 56 set in the main body, respectively.

Figure 25:
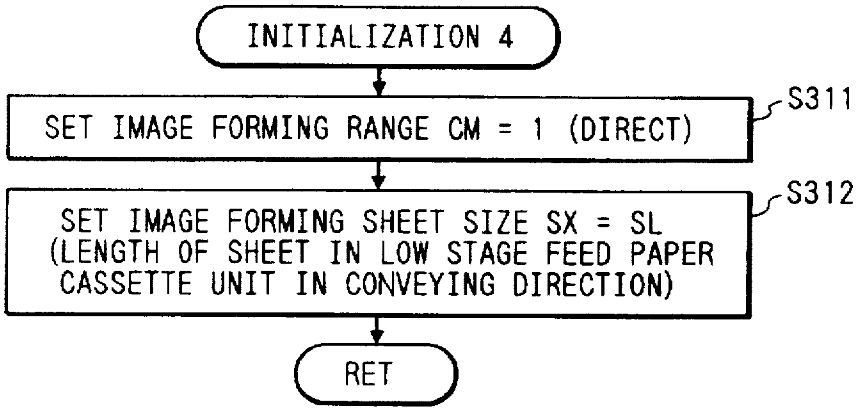
FIG. 25 is a detailed flowchart for an initializing routine 4 (S301) shown in FIG. 24.

FIG. 25 is a detailed flowchart showing an example of the initializing routine 4 (S301) shown in FIG. 24. S311 and S312 indicate processing steps.

First, to set the length in the original conveying direction into an image forming range, a direct copy magnification "1" is set into the variable CM of the image forming magnification as an initial value (S311). Subsequently, as an initial value of the image forming sheet size, the sheet size of the low stage paper feed cassette is set into the variable SX of the image forming sheet size (S312) and the processing routine is finished.

Figure 26:
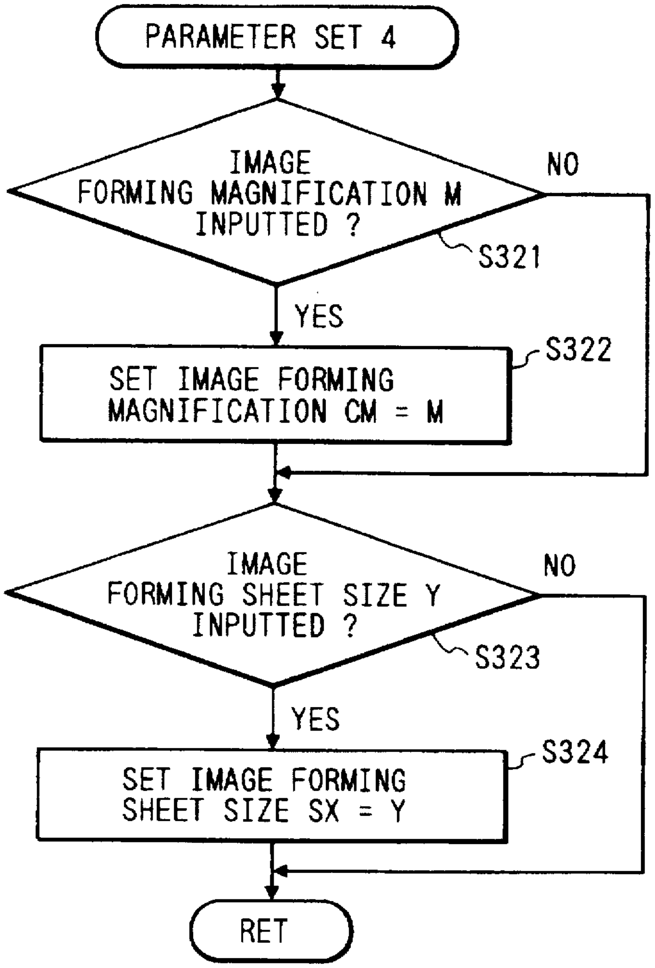
FIG. 26 is a detailed flowchart for a parameter setting routine 4 (S308) shown in FIG. 24.

FIG. 26 is a detailed flowchart showing an example of the parameter setting routine 4 (S308) shown in FIG. 24. S321 to S324 indicate processing steps.

First, a check is made to see if the image forming magnification M has been inputted or not (S321). If NO, the processing routine advances to step S323 and subsequent steps. If YES, the variable CM of the image forming magnification is changed on the basis of the inputted image forming magnification M (S322). Subsequently, a check is similarly made to see if the image forming sheet size Y has been inputted or not (S323). If NO in step S323, the processing routine is finished. If YES, the image forming sheet size SX is updated (S324) and the processing routine is finished.

Simultaneously with that the CFF 9 has been set into the main body 1 and the computer form paper 8 has been set to the tractor 22 and it is detected that the upper cover 29 has been closed, the CFF 9 enters the operation enable state. The CFF 9 is controlled independently of the main body 1. The main body 1 detects by the communication that the CFF 9 enters the operation enable state, so that the main body enters the copy start enable state. In this state, when the copy start key of the main body 1 is depressed, the parameters which are necessary for the image forming operation are set. At the same time, the pre-operations such as rotation of the cooling fan 28, movement of the lens 4 according to the magnification in the main body 1, and the like which are executed before the image forming operation are executed in accordance with a flowchart shown in FIG. 27.

Figure 27:
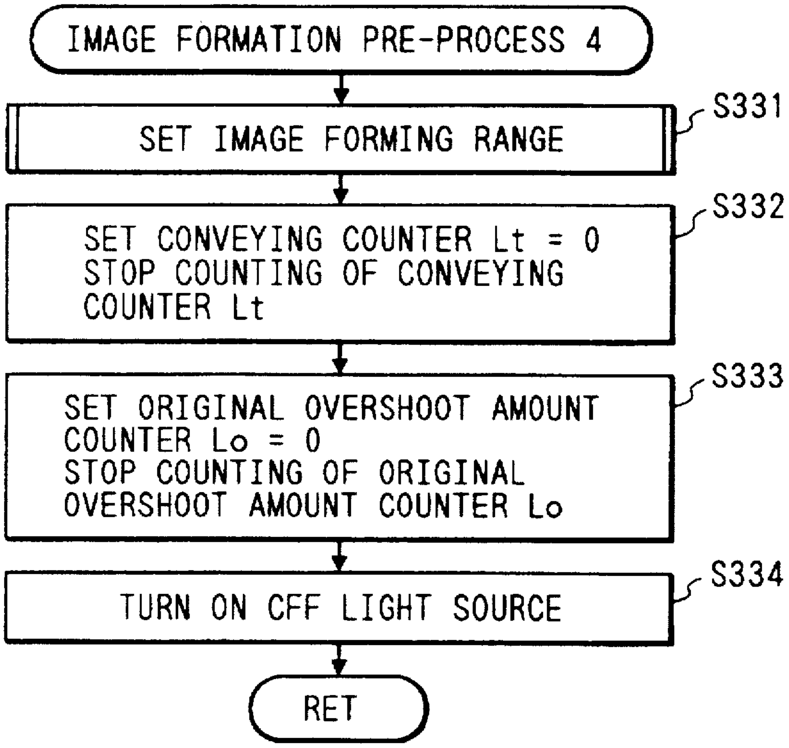
FIG. 27 is a flowchart for an image forming pre-processing routine 4 (S303) shown in FIG. 24.

FIG. 27 is a flowchart showing an example of the image forming pre-processing routine 4 (S303) shown in FIG. 24. S331 to S334 indicate processing steps.

First, an image forming range setting routine (which will be explained in detail hereinafter) to set an image forming range is executed (S331). The result of the selection is transmitted from the CFF 9 to the main body 1. The pre-operations such as movement of the lens 4 of the main body 1 and the like are started.

The counting operation of the conveying counter $L_f$ to count the conveying distance of the original is stopped and the count value is cleared (S332). Subsequently, the counting operation of the original overshoot amount counter $L_o$ to count the overshoot amount of the original is similarly stopped and the count value is cleared (S333). Those counters are counted by the encoder 33 and can be converted into the conveying distance by multiplying proper constant values. After that, the light source of the light source unit 24 of the CFF 9 is turned on (S334) for the image forming operation. The image forming pre-process is finished and an image conveying pre-processing routine, which will be explained hereinlater, is executed.

Figure 28:
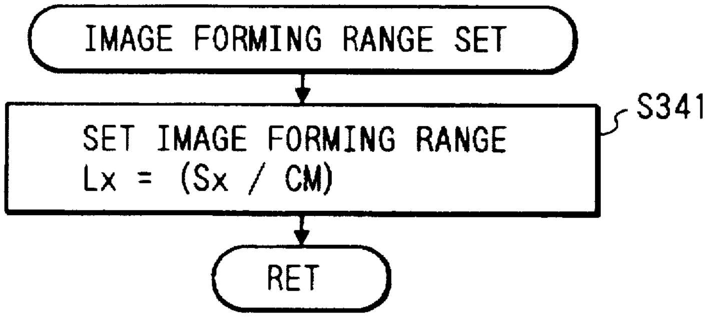
FIG. 28 is a flowchart for an image forming range setting routine (S341) shown in FIG. 24.

FIG. 28 is a flowchart showing an example of the image forming range setting routine (S331) shown in FIG. 24. S341 indicates a processing step.

In the diagram, $L_x$: image forming range (length in the conveying direction)

$S_x$: image forming sheet size (length in the conveying direction)

CM: image forming magnification

The image forming range $L_x$ is determined by $S_x$/CM (S341) and the processing routine is finished.

Figure 29A:
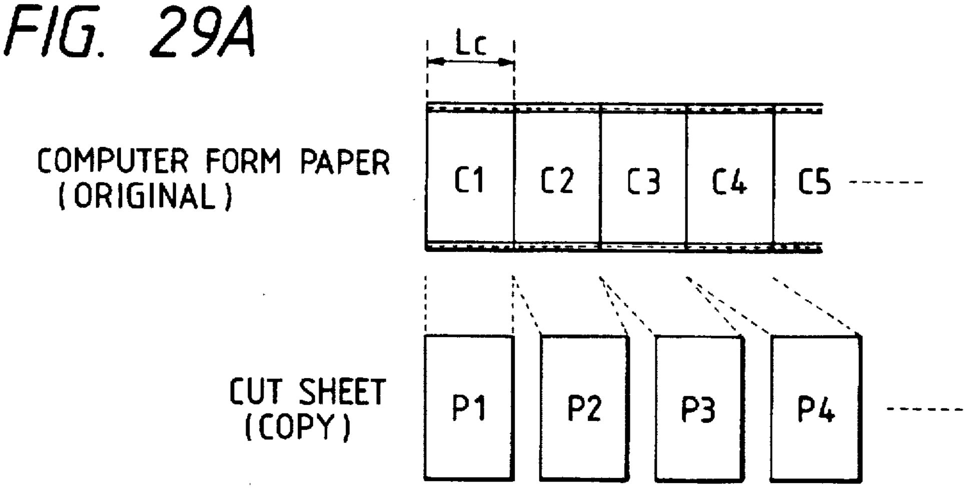
FIGS. 29A to 29C are diagrams showing copy results in the image forming apparatus according to the embodiment.
Figure 29B:
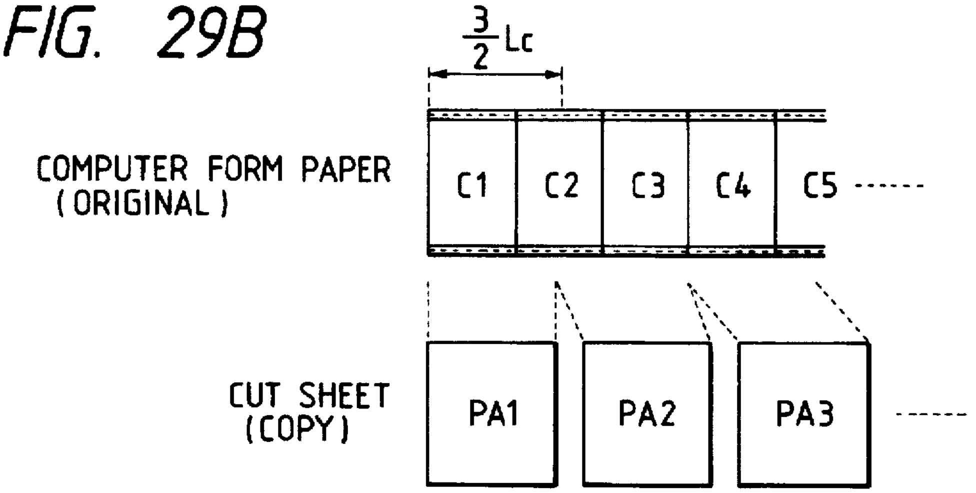
Figure 29C:
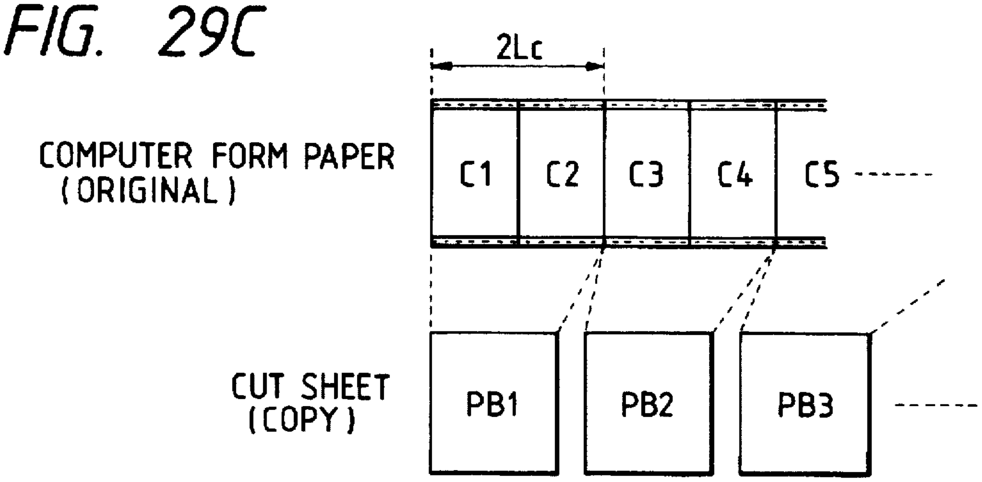

In the above construction, assuming that the image forming range is set to $L_c$ and the magnification is set to 1, as shown in FIG. 29A, computer form papers $C_1$ to $C_4$ can be copied on a page unit basis such that they are separated to cut sheets $P_1$ to $P_4$. Now, assuming that the image forming range is set to 3/2$L_c$ and the magnification is set to 1, as shown in FIG. 29B, the image of 1.5 page of the computer form paper can be copied to one cut sheet. On the other hand, when the image forming range is set to 2$L_c$ and the magnification is set to 3/4, as shown in FIG. 29C, the image as much as two pages of the computer form paper can be copied to one cut sheet. As mentioned above, the image in a desired range of the computer form paper can be copied to one cut sheet, so that the apparatus can accommodate various computer outputs.

Although each of the above embodiments has been described with respect to the case of selecting the length in the conveying direction of the original as an image forming range, a length in the direction perpendicular to the conveying direction of the original can be also selected as an image forming range or both of those data can be also used.

Although the above embodiment has been described with respect to the case where the data processes (selection of the magnification and the like) are executed by the CFF 9 on the basis of the communication data from the main body, it is also possible to construct in a manner such that by changing the content of the communication data, such data processes are executed in the main body.

The invention is not limited to the computer form paper but can be also applied to a long original.

Each of the first to third embodiments has been described above with respect to the case where by setting the image forming range as a range along the conveying direction of the computer form paper which is conveyed by the conveying means, the image in a desired range in the conveying direction of the computer form paper is formed onto a feedable paper without a lack of the image. However, by setting the image forming range as a range along the direction perpendicular to the conveying direction of the computer form paper which is conveyed by the conveying means, the image in a desired range perpendicular to the conveying direction of the computer form paper can be formed on the feedable paper without losing any portion of the image.

To realize such a method, the magnification in the direction perpendicular to the conveying direction of the computer form paper is calculated on the basis of the range perpendicular to the conveying direction and the width of the cut sheet. The lens is set to the position according to the magnification in the direction perpendicular to the conveying direction. The magnification in the conveying direction is calculated on the basis of the range in the conveying direction and the length of the cut sheet. The computer form paper is conveyed at the speed according to the magnification in the conveying direction. In this manner, the vertical and lateral sizes of the original can be independently variably magnified.

The fourth embodiment has been described above with respect to the case where the range setting means automatically sets a desired image forming range along the conveying direction of the computer form paper on the basis of the image forming paper feed sheet size condition and image forming magnification condition which have been set. It is, however, also possible to construct in a manner such that by automatically setting a desired image forming range along the direction perpendicular to the conveying direction of the computer form paper on the basis of the image forming paper feed sheet size condition and image forming magnification condition which have been set, the original image in a desired range along the direction perpendicular to the conveying direction in the computer form paper can be formed to the feedable paper without losing any portion of the image.

The present invention can be also applied to a digital reader or a digital copying apparatus.

As an image forming method, it is possible to use any one of the ink jet method, thermal jet method, thermal copy transfer method, thermal method, and the like.

As described above, since the image in a desired region in the long original can be formed, the original image in an arbitrary range in a long original such as a computer form sheet or the like can be easily obtained by simple operation. For instance, even in the case where an image exists on both of adjacent pages of a long original, the image in an arbitrary range in a desired long original can be easily copied.

What is claimed is:

1. A copying apparatus comprising:

conveying means for conveying a continuous original having a belt-like shape;

exposing means for exposing an image of the continuous original during conveyance of the continuous original by said conveying means;

copying means for copying the image exposed by said exposing means to a cut sheet; and range setting means for arbitrarily setting a range of the continuous original which is to be copied to one cut sheet, wherein said conveying means conveys the continuous original by an amount according to the range set by said range setting means during exposure by said exposing means, and wherein said conveying means conveys the continuous original at a speed according to the range set by said range setting means during exposure by said exposing means, to vary a magnification of the continuous original in its longitudinal direction, and wherein said copying means varies magnification of the continuous original in its width direction independently of varying the magnification of the continuous original in its longitudinal direction.

2. An apparatus according to claim 1, wherein said continuous original is a computer form paper.

3. An apparatus according to claim 2, wherein said conveying means conveys the computer form paper by driving convex portions inserted into holes formed on both sides of the computer form paper.

4. An apparatus according to claim 1, wherein said copying means comprises a photosensitive member and a developing device and forms a latent image of an image exposed by said exposing means on said photosensitive member, develops the latent image on said photosensitive member by said developing device, and copies the developed image from said photosensitive member to the cut sheet.

5. A copying apparatus according to claim 1, wherein said copying means copies one or a plurality of pages of images of the continuous original to one cut sheet.

6. A copying apparatus according to claim 1, further comprising a lens settable at a plurality of positions, wherein said copying means performs varying the magnification of the continuous original in its width direction by setting said lens at an appropriate position.

7. A copying apparatus according to claim 1, wherein said conveying means performs conveyance at a speed in accordance with a set length and a cut sheet size, and said copying means performs varying the magnification of the continuous original in its width direction by power in accordance with a set width and a cut sheet size.

* * * * *

UNITED STATES PATENT AND TRADEMARK OFFICE

CERTIFICATE OF CORRECTION

PATENT NO. : 5,758,246

DATED : May 26, 1998

INVENTOR(S) : NORIFUMI MIYAKE

It is certified that error appears in the above-identified patent and that said Letters Patent is hereby corrected as shown below:

COLUMN 9:

Line 11, "cassette" should read --casette,--.

COLUMN 13:

Line 13, "magnification" should read --magnification,--.

Signed and Sealed this

Twenty-second Day of June, 1999

Attest:

Q. TODD DICKINSON

*Attesting Officer* — *Acting Commissioner of Patents and Trademarks*